(12) United States Patent
Tracy et al.

(10) Patent No.: US 8,532,240 B2
(45) Date of Patent: Sep. 10, 2013

(54) DECOUPLING SAMPLING CLOCK AND ERROR CLOCK IN A DATA EYE

(75) Inventors: Paul Tracy, Schnecksville, PA (US); Mohammad Mobin, Orefield, PA (US); Ye Liu, San Jose, CA (US); Lane A. Smith, Easton, PA (US)

(73) Assignee: LSI Corporation, Milpitas, CA (US)

( * ) Notice: Subject to any disclaimer, the term of this patent is extended or adjusted under 35 U.S.C. 154(b) by 367 days.

(21) Appl. No.: 12/968,538

(22) Filed: Jan. 3, 2011

(65) Prior Publication Data
US 2012/0170621 A1    Jul. 5, 2012

(51) Int. Cl.
*H04B 1/10*      (2006.01)
*H04L 7/02*      (2006.01)
*H03K 5/159*     (2006.01)

(52) U.S. Cl.
USPC .......................................... 375/350; 375/233

(58) Field of Classification Search
USPC ................. 375/232, 233, 257, 259, 285, 350, 375/355
See application file for complete search history.

(56) References Cited

U.S. PATENT DOCUMENTS

| | | | |
|---|---|---|---|
| 2005/0226355 A1* | 10/2005 | Kibune et al. | 375/350 |
| 2010/0054383 A1* | 3/2010 | Mobin et al. | 375/371 |
| 2010/0238993 A1* | 9/2010 | Huang et al. | 375/233 |

* cited by examiner

*Primary Examiner* — Betsy Deppe (57) ABSTRACT

In described embodiments, a transceiver includes an eye monitor, clock and data recovery, and adaptation modules. Data sampling clock phase and error clock phase determined from a data eye are decoupled in the transceiver during a sampling phase correction process. Decoupling these clock phases during the sampling phase correction process allows relative optimization of system equalization parameters without degradation of various adaptation algorithms. Such adaptation algorithms might be employed for received signal gain and equalization such as, for example, Decision Feedback Equalizer (DFE) adaptation. Deriving the data sampling clock and error clock phases from the same clock generation source and with independent clock control enables an iterative sampling phase correction process that allows for accelerated clock and data recovery (CDR) without disturbing the data eye shape.

20 Claims, 6 Drawing Sheets

DECOUPLING SAMPLING CLOCK AND ERROR CLOCK IN A DATA EYE

BACKGROUND OF THE INVENTION

1. Field of the Invention

The present invention relates to communication transceiver clock and data recovery, and, in particular, to reducing acquisition time for sampling and tracking data in the presence of sampling skew.

2. Description of the Related Art

In many data communication applications, Serializer and De-serializer (SerDes) devices facilitate the transmission between two points of parallel data across a serial link. Data at one point is converted from parallel data to serial data and transmitted through a communications channel to the second point where it received and converted from serial data to parallel data.

At high data rates, frequency-dependent signal loss from the communications channel (e.g., the signal path between the two end points of a serial link) as well as signal dispersion and distortion can occur. As such, the communications channel, whether wired, optical, or wireless, acts as a filter and might be modeled in the frequency domain with a transfer function. Correction for frequency dependent losses of the communications channel, and other forms of signal degradation, often requires signal equalization at a receiver of the signal. Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. An automatic adaptation process is often employed to adjust the equalizer's response. Equalization might be through a front end equalizer, a feedback equalizer, or some combination of both.

Figure 1:
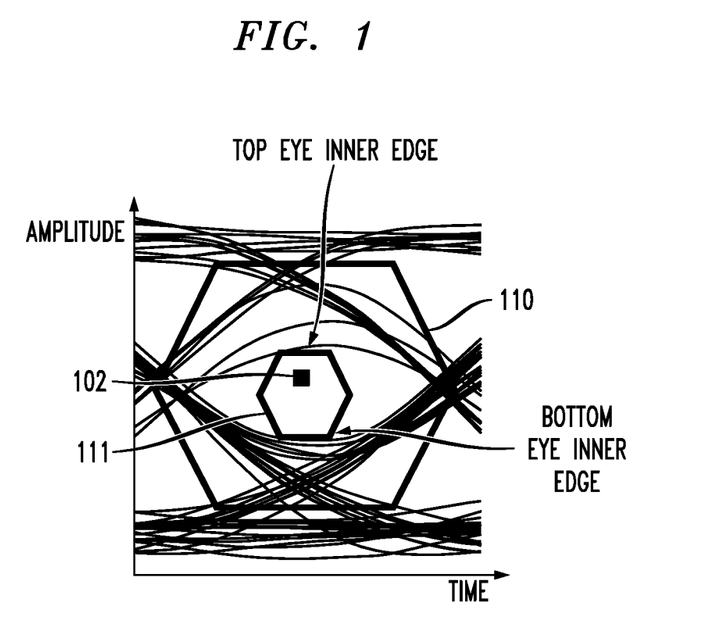
FIG. 1 shows an exemplary data eye diagram of prior art systems.

FIG. 1 shows a data eye diagram 100 overlaid with exemplary data sampler (DS) 102. Data eye diagram 100 illustrates super-positions of many data eyes of signal transitions expressed in amplitude versus time (in unit interval, or "UI", corresponding to a symbol period). The data eye is created as signals transition from low to low, low to high, high to low and high to high. Top and bottom transition samplers (not shown in FIG. 1) are placed in the data stream to capture the frequency and phase of the data transitions, and this timing is then used by a clock and data recovery circuit to set correct frequency and phase of a sampling clock. As employed herein, "placing" a sampler (latch) in a data stream requires setting a voltage threshold and clocking phase of the sampler to detect a predetermined point in the data eye. Clocking the data sampler with a clock signal with known frequency and phase derived with respect to the detected symbol transitions of data allows for clock recovery of symbols within the data stream generating the eye. Thus, "placing" a data sampler in the signal path with a threshold and sampling clock equivalent to the amplitude and timing at the center of the eye corresponds to correct sampling to make a decision as to the value of a received data symbol.

Ideally, without noise, jitter, and other loss and dispersion effects, the data eye will exhibit a relatively ideal shape, illustrated as ideal eye 110. In practice, as described previously, the shape of the data eye changes, illustrated as actual eye 111, with noise, jitter, other loss and dispersion effects, and temperature and voltage variations. The shape of the data eye also changes due to equalization applied to input signal of the receiver. In some systems, equalization is also applied by a transmitter's equalizer, further altering the shape of the eye from the ideal. After equalization, the inner eye of the transceiver is open, with some margin for supporting channels. If a simple, analog front-end equalizer (AFE) is employed, the data eye operating margin improves. However, better performance might be achieved through use of a Decision Feedback Equalizer (DFE) in combination with an AFE. Classical DFE equalization optimizes for ISI and opens up the vertical and horizontal data eye opening.

In emerging systems, such as those specified in 12G SAS applications, the receiver and the transmitter optimize the transmitter and the receiver equalization parameters jointly, increasing the adaptation and system acquisition time. In presence of sampling skew equalization, the acquisition time is amplified by a factor equal to the number of phase updates employed during skew equalization.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention, an eye monitor, including an error sampler and a data sampler, generates a data eye from a data stream subject to equalization. A clock and data recovery (CDR) circuit generates a transition clock based on data transitions in the data eye, wherein the CDR shifts, in phase, the transition clock with a fixed phase offset to generate an error clock signal to the error sampler and, at an initial time, a data clock to the data sampler. An adaptation module adaptively sets parameters of equalization applied to the data stream based upon an output of the error sampler and an output of the data sampler. At a subsequent time, the CDR decouples the error (e.g., error slicer) clock and the data (e.g., data slicer) clock to generate a relative optimum phase for the data clock for the data sampler.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, a transceiver includes a clock and data recovery module with an eye monitor, and an adaptation module for adaptively setting parameters of various circuit elements, such as equalizer and gain elements. Data sampling clock phase and error clock phase determined from a data eye are decoupled in the transceiver during a sampling phase correction process that occurs, for example, for skew equalization. Decoupling these clock phases during the sampling phase correction process allows relative optimization of receiver, and also transmitter, equalization parameters without degradation of various adaptation algorithms. Such adaptation algorithms might be employed for received signal gain and equalization such as, for example, Decision Feedback Equalizer (DFE) adaptation. Deriving the data sampling clock and error clock phases from the same clock generation source but with independent clock control allows accelerated parameter convergence without multiple iterations.

Figure 2:
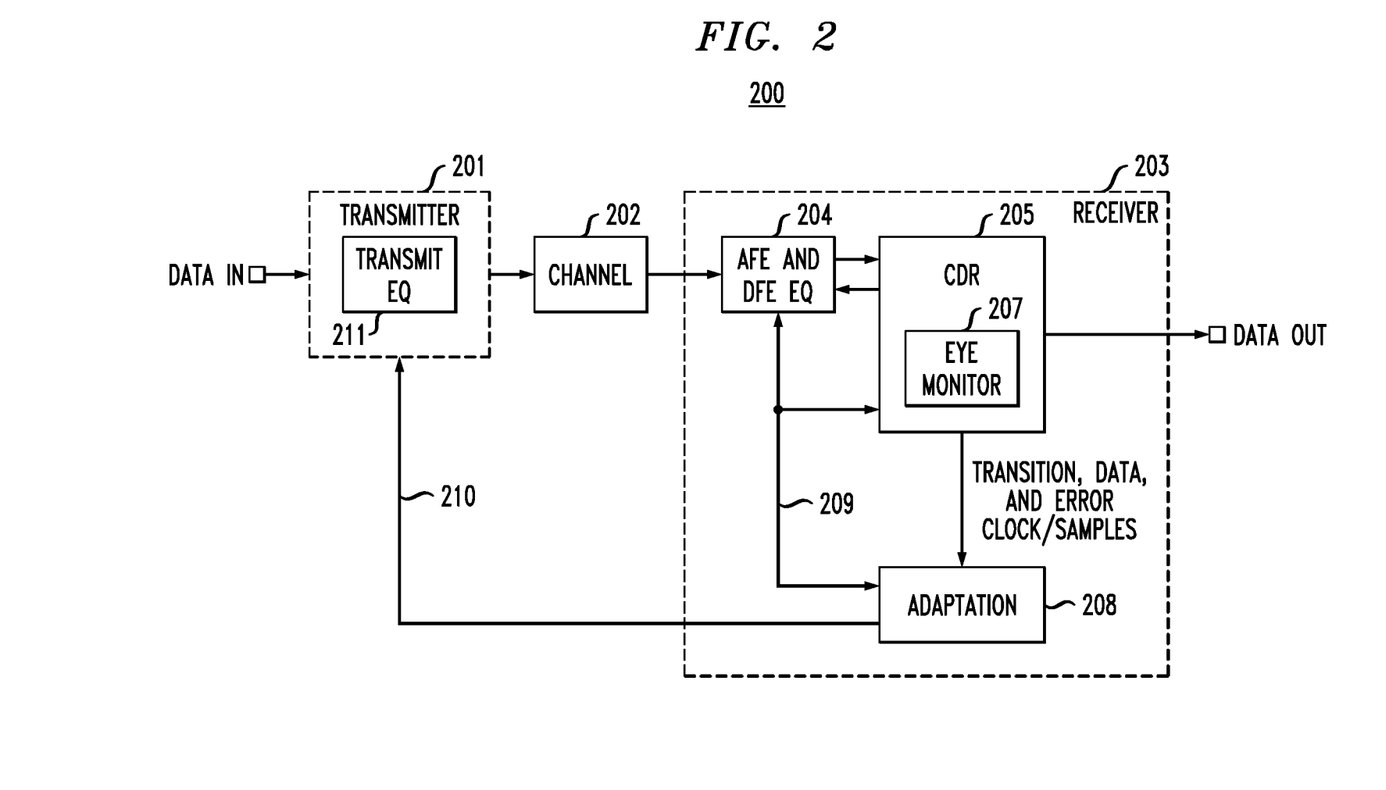
FIG. 2 shows a block diagram of communication system operating in accordance with exemplary embodiments of the present invention.

FIG. 2 shows a block diagram of communication system 200 with a receiver operating in accordance with exemplary embodiments of the present invention. System 200 includes transmitter 201 that transmits a signal through communication channel 202. Channel 202, which might be wired, wireless, optical or some other medium, has an associated transfer function, loss characteristics, and/or other means for adding impairments to the signal passing through it. System 200 further includes receiver 203 having receive equalizer (AFE & DFE EQ) 204 to apply equalization to the received signal correct frequency losses, inter symbol interference (ISI) or other impairments applied to the signal by channel 202. AFE & DFE EQ 204 might comprise an analog front end (AFE) equalizer followed by a DFE equalizer, but might also include filtering and gain elements. Receiver 203 also includes clock and data recovery unit (CDR) 205 having real-time data eye monitor 207, and adaptation module 208. AFE & DFE EQ 204 is coupled to adaptation module 208 through link 209 to receive the equalized data stream (either from an AFE equalizer, a DFE equalizer, or both) and exchange information of equalizer and gain parameters to adaptively set gain and equalization of receiver 203. CDR 205, including eye monitor 207, is coupled to adaptation module 208 to provide transition sample, data sample, and error sample information (clock signals and sample values discussed subsequently), as well as data decisions and other information employed by adaptation module 208 for the adaptation process from initial lock on the input data signal by CDR 205, to adaptation convergence, to steady state operation.

Also shown in FIG. 2 is back-channel link 210 that might allow for communication between adaptation module 208 of receiver 203 and a transmit equalizer (TX EQ) 211 of transmitter 201. Based on such communication, adaptation module 208 and TX EQ 211 might adaptively set transmit equalizer settings (e.g., tap values), based on the received data stream at receiver 203.

Eye monitor 207 monitors the data eye of the equalized received signal, providing information of eye characteristics based on samplers positioned within the data stream. CDR 205 processes the equalized signal from AFE & DFE EQ 204 to recover timing for locally generated clock signals that sample the equalized signal. Such sampling includes: i) generating transition samples and error samples to recover timing associated with data transitions (e.g., a transition clock) and to generate information for parameter adaptation (e.g., for equalizer and gain adaptation); and ii) recovering timing for data sampling to generate decisions for data symbols. CDR 205 also employs information of eye characteristics from eye monitor 207 to adjust for various clock timing skew of CDR 205. Adaptation module 208 also receives information of eye characteristics from eye monitor 207 to provide local control signals that set various parameters of gain and equalization of receiver 203, and sends signals to TX EQ 211 for adjusting gain and equalization parameters of transmitter 201.

Figure 3:
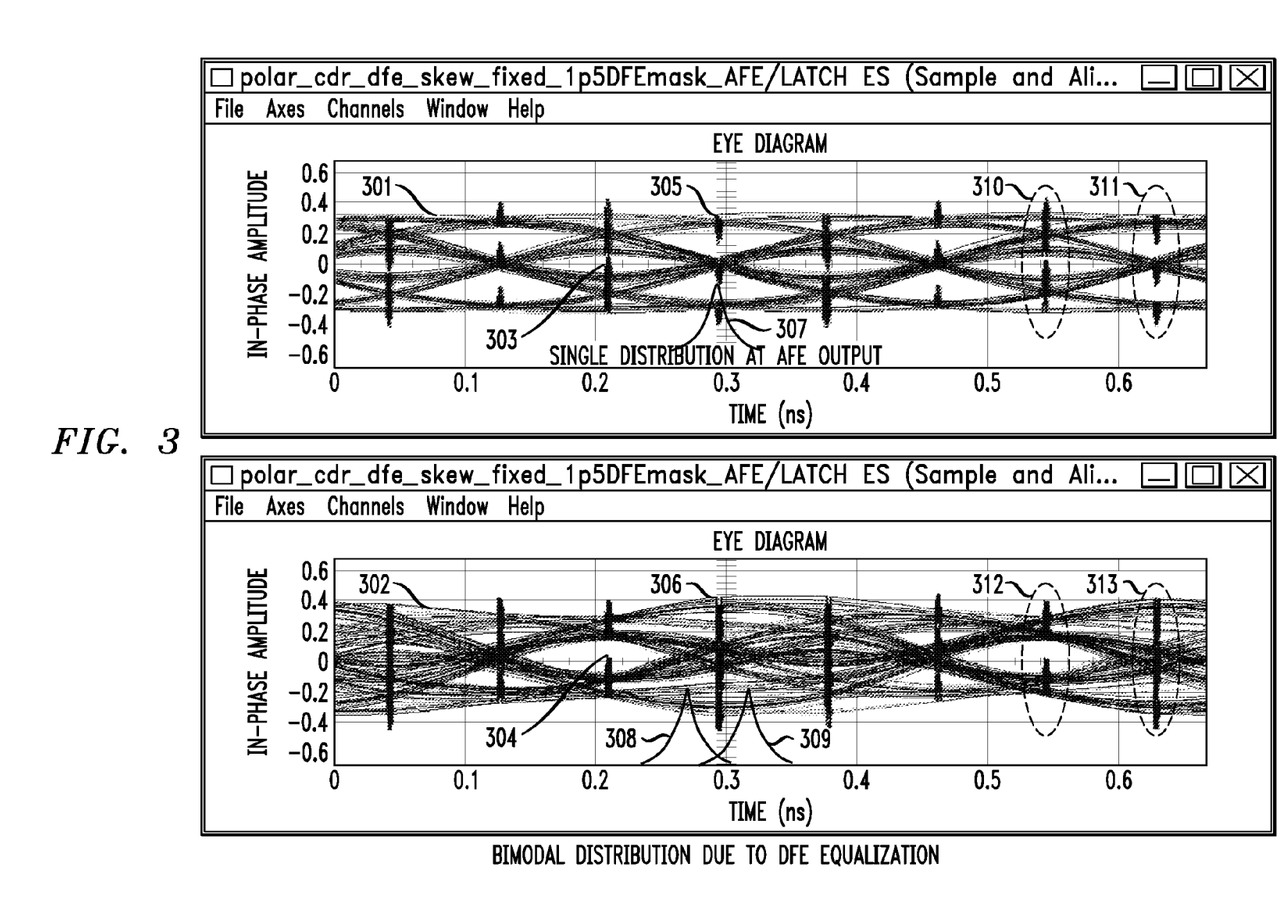
FIG. 3 shows a comparison of eye characteristics and transition distribution for a data stream with AFE equalization and DFE equalization.

FIG. 3 shows a comparison of eye characteristics and transition distribution for a data stream with AFE equalization 301 and DFE equalization 302. As before, AFE equalization 301 and DFE equalization 302 represent super-positions of many data eyes of signal transitions expressed in amplitude versus time. Histograms of data sampling clock are shown, such as histogram 310 for AFE equalization 301 and histogram 312 for DFE equalization 302. Histograms of transition sampling clock distribution are also shown, such as histogram 311 for AFE equalization 301 and histogram 313 for DFE equalization 302. The comparison of eye characteristics and transition distribution for a data stream with AFE equalization 301 and DFE equalization 302 of FIG. 3 is shown for right-edge sampling, where the data sampling clock is derived from the transition sampling clock histogram to the right of the corresponding data sampling clock histogram. Other embodiments of the present invention might be derived for left-edge sampling, or combinations of right- and left-edge sampling.

With AFE equalization, data eye 303 exhibits a narrow opening (low amplitude margin and spread phase margin), resulting in errors for data detection due when attempting to recover and adjust sampling time for the center of data eye 303. The sampling time is related to the symbol period, so a receiver's CDR circuit attempts to determine the correct timing through detection of transitions for the sampling clock, and then determine the phase of the sampling clock with respect to the data stream corresponding to the center of the eye. The transition 305 between symbols, or symbol edge, is shifted in phase by approximately half of the symbol period (½ UI) from the center of data eye 303 with some variance caused by the randomness of the data, and possibly other, pre-determined amount of phase shift for a given implementation or design. With AFE equalization 301, symbol transitions generally exhibit a single distribution. In other words, the transition occurs with an average timing value approximately equivalent to the symbol timing but shifted in phase from the symbol center timing by one half of the symbol period, and with relatively small variance in timing of the transition about this average timing value.

In comparison, with DFE equalization 302, data eye 304 exhibits a large (e.g., height) opening, resulting in enhanced voltage and phase margin. However, with DFE equalization 302, data eye transition 306 exhibits a bimodal to multi-mode distribution. In other words, the transition occurs with a first average transition phase error leading the predicted transition clock phase and a second average transition phase error lagging the predicted transition clock phase. In addition, the first and second average transition phases include corresponding variances in timing of the transition about these average transition timing values.

The bimodal distribution associated with DFE equalization results from the feedback loop characteristics of a DFE as well as adaptive setting of DFE filter parameters when presented a data stream of i) long runs of 1's and long runs of 0's (distribution 308) or ii) rapidly alternating 1's and 0's (distribution 309). As timing is recovered and sampling phase set for a data eye at a given time, DFE filter parameters are then adaptively adjusted to recover voltage and phase margin. But adaptively setting the DFE filter parameters, in-turn, modifies the shape of the data eye at a subsequent time, requiring adjustment to the sampling phase to adjust it toward the center of the data eye at the next transition.

If the sampling of the data eye center is delayed, the center position of the data eye moves with respect to the AFE-only data eye with sampling lock timing (approximately ½ UI from transition lock). The movement of the center eye changes based on the characteristics of the data and the DFE adaptation process of adaptation module 208. CDR 205 might lock to this transition phase in such a way that CDR 205 converges (locks) its locally-generated transition clock signal to transitions (termed herein as "transition clock") in between the two bimodal distributions. CDR 205 might then lock its sampling clock to this transition clock with a fixed offset (e.g., approximately ½ UI plus additional offset dependent upon a given implementation). Note that CDR 205, through eye monitor 207, monitors the transitions with, for example, latches at the transition points (i.e., by placing one or more latches at the center of transition points 305 for AFE or 306 for DFE in FIG. 3).

When the clock of a data sampler is coupled to the transition clock (e.g., fixed at ½ unit interval or UI) and DFE equalization commences, the data sampler is not necessarily positioned at an optimal position within the eye (e.g., not positioned at the center of the eye) for data sampling, causing a loss of operating margin for the CDR. The position of the symbol sampling phase is also a function of transmitter equalization and channel characteristics, as described above. Thus, skew equalization techniques are used to optimize the sampling skew of a receiver. In current systems, the error sampler and data sampler clocks are tied, each being derived from the transition clock. Once sampling skew phase is updated, when tying the data sampler's clock to the DFE error samplers, the adaptation process using the DFE error sampler output will start to update the DFE taps suitable for this new phase, requiring several iterations of this process to complete. This process might limit a receiver's acquisition performance by extending the time required to establish the data link in steady state operation of the receiver.

Figure 4:
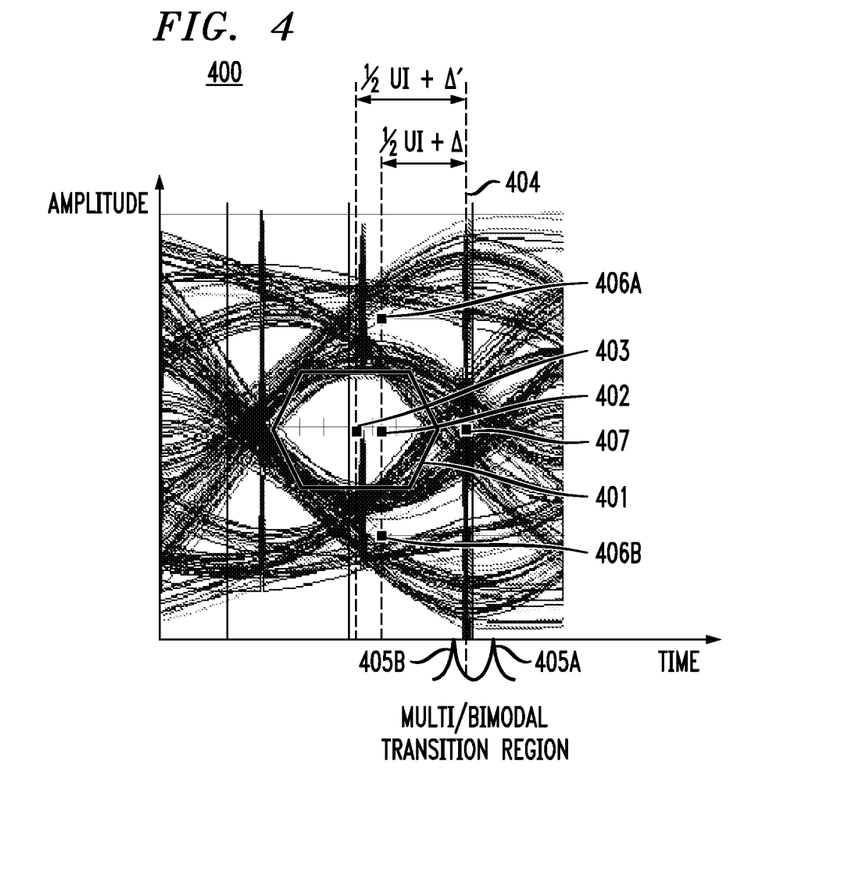
FIG. 4 shows a data eye diagram overlaid with exemplary data sampler and error sampler as might be employed by the system of FIG. 2.

FIG. 4 shows a data eye diagram 400 illustrating operation of data and error samplers in accordance with exemplary embodiments of the present invention. Data eye diagram 400 illustrates super-positions of data eyes of signal transitions expressed in amplitude versus time (unit interval, or "UI", corresponding to a symbol). The data eye of interest 401 is shown within the data stream subject to DFE equalization adaptation. Data sampler (DS) 402 (which might be implemented as a latch) and error samplers (ES) 406A and 406B (which also might be implemented as latches) are shown overlaid on data eye diagram 400. Error samplers such as ES 406A and 406B might be employed to provide error samples used by the equalization process by adaptation module 208 and by CDR 205. Ideally, with perfect sampling clock timing recovery, the data sampling latch is placed at the center of the data eye, which might correspond to a sampling clock phase shifted in time ½ UI from some ideal timing lock point, plus some a priori determined non-zero phase value $\Delta$ (shown in the FIG. as ½ UI±$\Delta$). An additional phase appears, however, since DFE equalization is employed that skews the phase between the transitions and the center of the eye. Consequently, an initial location for a data sampler is shown as DS 402, aligned with error samplers 406A and 406B, but a preferred location within the eye for the data sampler as adaptation converges is shown as DS 403.

CDR 205 employs transition sampler 407 to detect data transitions as illustrated at timing lock point 404. At the beginning of the DFE adaptation, the AFE output might be employed to lock CDR 205. After CDR 205 locks, the separation between transition latch 407 and DS 402 is (½ UI+$\Delta$), and the data sampler is sampling data at the middle of the AFE eye. Before applying DFE adaptation, transition sampler 407 is also separated from error samplers 406A and 406B by (½ UI+$\Delta$), where, as described previously, L1 is an initial, 0, positive, or negative phase value in radian scale that may a known, a priori implementation specific value. After DFE equalization, DS 402 and error samplers 406A and 406B being tied to a clock phase of (½ UI+$\Delta$) derived from transition sampler 407 might result in DS 402 sampling at a sub-optimal phase, where the data sampling might not occur at the center of the DFE-equalized horizontal eye opening. As a result, embodiments of the present invention optimize the subsequent position of the data sampler to DS 403 by adjusting the phase from (½ UI+$\Delta$) to (½ UI+$\Delta'$) while keeping error samplers 406A and 406B positioned at ½ UI+$\Delta$ such that the phase separation between the data sampler and the error samplers is now ($\Delta'$ - $\Delta$). In this process, since the position of the error samplers is not changed, the DFE tap adaptation values remain unchanged, but the data sampling is now at a relatively optimal position at or near the horizontal middle of the eye. Consequently, data sampling margin by DS 403 is optimized.

As described, CDR 205 detects transition lock at point 404 within the bimodal distribution region with leading and lagging distributions 405A and 405B, respectively. In general, the point 404 that CDR 205 locks its locally generated clock to is at a phase that is near or centered on one of the means of the leading and lagging distributions 405A and 405B. In accordance with exemplary embodiments of the present invention using right-edge sampling, ES 406A and 406B are placed at a point ½ UI+$\Delta$ before point 404. In other words, error clock timing ("error clock") for ES 406A and 406B is derived as the transition clock timing of timing lock point 404, but shifted in phase by a fixed ½ UI+$\Delta$. The exemplary embodiment is described herein for detecting errors on one side of the center of eye 401, but one skilled in the art might readily extend the teachings herein to detecting errors to the left, right or both of the center of eye 401.

The output values of DS 402 are initially clocked with an error clock derived from the transition clock, and CDR locking is performed with the outputs of DS 402 and transition sampler 407, while DFE adaptation is performed with the outputs of ES 406A and 406B. Then, DS 402 is moved to the position of DS 403 with new phase (½ UI+$\Delta'$) from transition sampler 407. Consequently, the adaptation process might converge faster. Employing samples from latches timed with the new phase of clock does not change various mathematical expressions associated with classical zero-forcing adaptation algorithms. As a result, de-coupling the error clock from the sampling clock does not violate classical DFE adaptation algorithms, yet supports emerging sampling phase repositioning methods without acquisition penalty.

Initially, adaptation module 208 performs the DFE adaptation by aligning the DS 402 and ES 406A and 406B of eye monitor 207, or a known offset is applied between them as a function of a given implementation. Concurrently, CDR 205 converges to transition lock to provide the locally generated transition clock signal. After the DFE and CDR adaption loops converge, the error clock of ES 406A and 406B is kept unchanged, maintaining the position of ES 406A and 406B at ½ UI, but a sampling clock is applied to DS 402 with appropriate sampling phase offset required in the application, thereby possibly changing the position within the data eye of the data sampler to, for example, DS 403 in FIG. 4. While the exemplary embodiment of the present invention is described employing a single data sampler (or latch) that is initially placed and clocked as DS 402, and subsequently de-coupled and moved to the position of DS 403 by interpolating the transition and error clocks, the present invention is not so limited. One skilled in the art might employ at least two separate data samplers, one for initial adaptation and the other for de-coupled operation with an interpolated clock.

Thus, after initial adaptation, de-coupling is accomplished by generating the sampling clock for the data sampler with a given frequency/phase to shift the sampling clock (½ UI+Δ') in phase of timing lock point 404. The approximate phase Δ' is generated by interpolating the available clock phases from the CDR (e.g., error, transition, or other implementation-specific clock signals), accounting for any a priori known phase offset (e.g., offset Δ). This interpolation is based upon the width of the multi-mode/bimodal transition region about point 404, and might be calculated ahead of time through characterization of a given application or design. Thus, the interpolated clock signal is applied so the data sampler is placed in the signal path with a threshold and sampling clock equivalent to the amplitude and timing near the center of the eye (to position of DS 403) that corresponds to relatively correct timing for CDR 205 when making a decision as to the value of a received data symbol.

The CDR acquisition can be performed by three methods: 1) Pre DFE, where CDR transition lock is via sampling of the AFE output; 2) Pre H1, where CDR transition lock is via sampling of the DFE output but excludes the contribution of the H1 equalizer coefficient; and 3) Post H1, where CDR transition lock is via sampling of the full DFE output.

Figure 5:
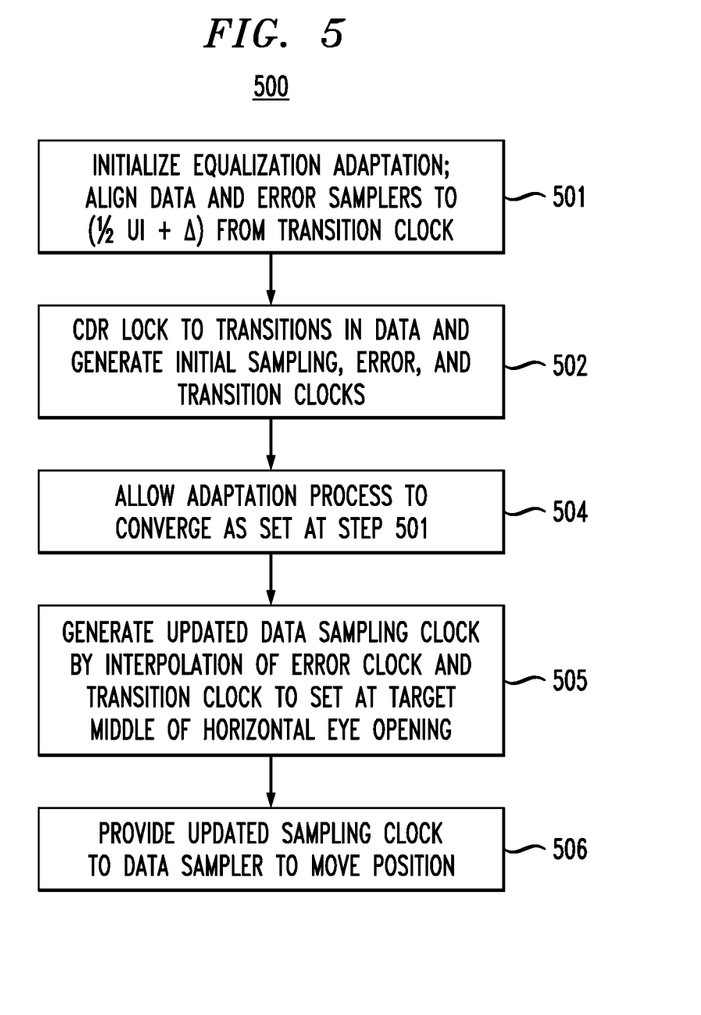
FIG. 5 shows an exemplary method of operation for the system of FIG. 2.

FIG. 5 shows an exemplary method of operation 500 for system 200. At step 501, the system initializes equalizer adaptation, and data and error samplers are aligned to (½ UI+Δ) or otherwise set to a predefined relationship (for a right transition clock phase). At step 502, the CDR locks to data transitions to provide a locally generated transition clock. At step 504, the DFE adaptation process converges using transition, error and data sample information as set at step 501. At step 505, the sampling clock is generated by interpolation of the error clock and transition clock to a target phase that represents a middle of the eye horizontal opening (e.g., (½ UI+Δ')). At step 506, the interpolated sampling clock is provided to the data sampler.

The benefit of de-coupling in accordance with embodiments of the present invention might be illustrated with the following example. Typically, joint adaptation of transmitter and receiver requires approximately 70 msec per iteration. If ten iterations for sampling phase adjustment are required to determine best sampling phase, joint transmitter and receiver adaptation requires 700 msec without de-coupling. With decoupling, joint adaptation of transmitter and receiver requires approximately 70 msec. For the example, classical DFE adaptation structure consists of two sample summers and two transition summers. The Analog Front End (AFE) output samples are routed to four summers. Two summers, one for even samples and one for odd samples, are associated with data recovery. Two summers, one for even samples and one for odd samples, are associated with transitions for clock recovery (transition clock). The sampling latch associated with data recovery (for samples input to the even and odd data summers) and the DFE error latch associated with transitions for clock recovery (for samples input to the even and odd transition clock summers) are not tied to a common phase.

Figure 6:
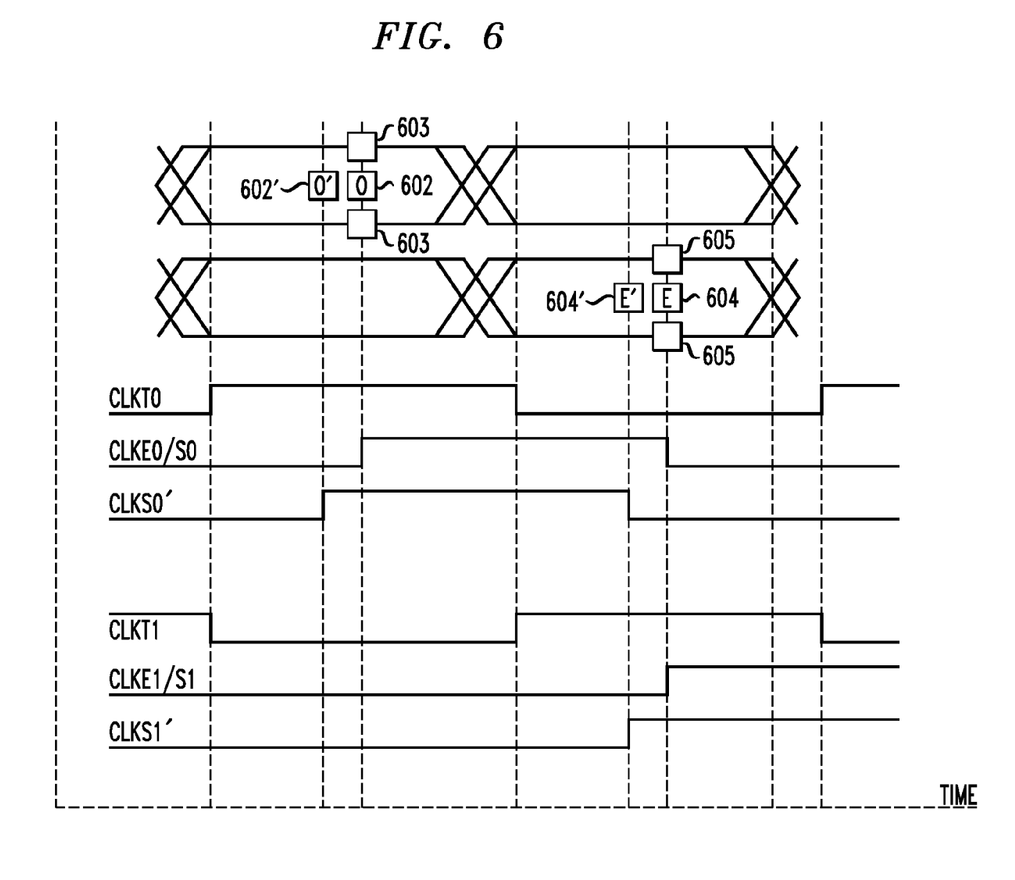
FIG. 6 shows clock signal timing relationships for an exemplary embodiment of the present invention.

The timing for a latch output pipeline used for odd and even error based DFE tap adaptation is shown in FIG. 6. In FIG. 6, E represents even data sampler update at adaptation iteration n, and O represents odd data sampler update at adaptation iteration n. For FIG. 6, CLKT0 represents the transition clock signal for odd samples, CLKE0/S0 represents the error clock signal (for error samplers 603) and data sample clock signal (for data sampler 602) for odd samples before adaption convergence; and CLKS0' represents the data sample clock signal for odd samples (being the de-coupled, interpolated error clock signal of an interpolator for updated data sampler 602'). Similarly, CLKT1 represents the transition clock signal for even samples, CLKE1/S1 represents the error clock signal (for error samplers 605) and data sample clock signal (for data sampler 604) for even samples before adaption convergence; and CLKS1' represents the sample clock signal for even samples (being the de-coupled, interpolated error clock signal of an interpolator for updated data sampler 604').

While the exemplary embodiments herein show a two error detectors placed within the eye, the present invention is not so limited. One skilled in the art might employ one or more error samplers to increase accuracy. Each sampler might have a corresponding threshold control and comparator, and in addition to tracking the error, one might employ the additional error samplers to determine, for example, rate of change in phase error or similar quantities.

A transceiver operating in accordance with one or more embodiments of the present invention might provide for the following advantages. The transceiver might exhibit increased performance and effectively accelerate CDR acquisition time by decoupling the CDR acquisition loop from the adaptation process, such as performed by adaptation of the DFE acquisition loop. For example, DFE equalization might be employed to improve noise margin and degrade jitter margin, but with improved CDR acquisition over systems requiring an iterative process without optimized sampling phase such as described herein. Consequently, such transceiver might exhibit increased speed and reliability in unfavorable communication environments.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An apparatus comprising:
   a receiver comprising:
   an eye monitor configured to generate a data eye from a data stream subject to equalization, the eye monitor including at least one error sampler, at least one transition sampler, and at least one data sampler;
   a clock and data recovery (CDR) circuit configured to generate a transition clock for each transition sampler based on data transitions in the data eye, wherein the CDR shifts, in phase, the transition clock with a fixed phase offset to generate an error clock signal to each error sampler and, at an initial time, a data clock to each data sampler, and
   an adaptation module configured to adaptively set parameters of equalization applied to the data stream based upon an output of the error sampler and an output of the data sampler,
   wherein, at a subsequent time, the CDR decouples the error clock and the data clock to generate a relative optimum phase for the decoupled data clock for each data sampler.

2. The apparatus of claim 1, wherein the equalization is applied to the data stream by an equalizer of the receiver, and wherein the equalizer is a decision feedback equalizer (DFE) of the receiver.

3. The apparatus of claim 2, wherein a predefined range for the relative optimum phase for the data clock is based on a range of a bimodal distribution of a DFE-equalized data eye.

4. The apparatus of claim 1, wherein, during an acquisition period, the adaptation module is further configured to obtain a CDR lock and an adaptation convergence, the acquisition period occurring between the initial time and the subsequent time.

5. The apparatus of claim 4, wherein the adaptation module is further configured to adaptively set parameters of at least one of a filter and a gain applied to the data stream based upon an output of the error sampler.

6. The apparatus of claim 4, wherein the data sampler comprises at least one latch including a first latch employed for data sampling at the initial time and a second latch employed at the subsequent time.

7. The apparatus of claim 1, wherein:
   the error sampler monitors a vertical position of the eye with respect to a center of the eye;
   the data sampler samples the substantially center position of the eye, the center position corresponding to a data symbol,
   wherein the outputs of at least one of the error sampler and the data sampler indicate a shift, in phase, of the center of the eye.

8. The apparatus of claim 7, wherein the data sampler samples at the substantially center position of the eye to detect data symbols of the data stream.

9. The apparatus of claim 1, wherein the CDR shifts, in phase, the transition clock with the fixed phase offset of substantially ½ UI (unit interval) ±N, N a phase and ½ UI≧N≧0, to generate the data clock signal for each corresponding data sampler.

10. The apparatus of claim 1, wherein the receiver is coupled to a transmitter and the adaptation module is in communication with the transmitter configured to provide the data stream,
wherein the transmitter, based on an indication of the adaptation module, adaptively sets parameters of each device of the transmitter in a signal path of the data stream, each device comprising at least one of a gain, a filter, and an equalizer.

11. The apparatus of claim 1, wherein the apparatus is embodied in a Serial DeSerializer (SerDes) device.

12. A method comprising:
generating, with an eye monitor of a receiver, a data eye from a data stream subject to equalization, the eye monitor including at least one error sampler, at least one transition sampler, and at least one data sampler;
generating, with a clock and data recovery (CDR) circuit of the receiver, a transition clock for each transition sampler based on data transitions in the data eye;
shifting, in phase, the transition clock with a fixed phase offset, thereby generating an error clock signal to each error sampler and, at an initial time, a data clock to each data sampler;
adaptively setting parameters of equalization applied to the data stream based upon an output of the error sampler and an output of the data sampler;
decoupling, by the CDR circuit, the error clock and the data clock; and
generating, at a subsequent time, a relative optimum phase for the decoupled data clock for each data sampler.

13. The method of claim 12, further comprising, during an acquisition period, obtaining a CDR circuit lock and an adaptation convergence, the acquisition period occurring between the initial time and the subsequent time.

14. The method of claim 12, comprising:
monitoring, with the error sampler, a vertical position of the eye with respect to at least one of a left of and a right of a center of the eye;
sampling, with the data sampler, the substantially center position of the eye, the center position corresponding to a data symbol,
indicating, by the outputs of at least one of the error sampler and the data sampler, a shift, in phase, of the center of the eye.

15. The method of claim 14, wherein the data sampler samples the substantially center position of the eye to detect data symbols of the data stream.

16. The method of claim 12, comprising shifting, in phase, by the CDR the transition clock with the fixed phase offset of substantially ½ UI (unit interval) ±N, N a phase and ½ UI≧N≧0, to generate the data clock signal for each corresponding data sampler.

17. The method of claim 12, wherein the receiver is coupled to a transmitter, further comprising adaptively setting parameters of each device of the transmitter in a signal path of the data stream, each device comprising at least one of a gain, a filter, and an equalizer.

18. The method of claim 12, wherein the method is embodied as steps executed by a processor in a Serial DeSerializer (SerDes) device.

19. The method of claim 12, further comprising initially aligning the error sampler and the data sampler before adaptively setting the parameters of the equalization.

20. A non-transitory machine-readable storage medium, having encoded thereon program code, wherein, when the program code is executed by a machine, the machine implements a method for adaptively setting equalization in a receiver, comprising the steps of:
generating, with an eye monitor of a receiver, a data eye from a data stream subject to equalization, the eye monitor including at least one error sampler, at least one transition sampler, and at least one data sampler;
generating, with a clock and data recovery (CDR) circuit of the receiver, a transition clock for each transition sampler based on data transitions in the data eye;
shifting, in phase, the transition clock with a fixed phase offset, thereby generating an error clock signal to each error sampler and, at an initial time, a data clock to each data sampler;
adaptively setting parameters of equalization applied to the data stream based upon an output of the error sampler and an output of the data sampler;
decoupling, by the CDR circuit, the error clock and the data clock; and
generating, at a subsequent time, a relative optimum phase for the decoupled data clock for each data sampler.

* * * * *